(12) United States Patent
Kobayashi et al.

(10) Patent No.: US 11,708,029 B2
(45) Date of Patent: Jul. 25, 2023

(54) VEHICLE

(71) Applicant: HONDA MOTOR CO., LTD., Tokyo (JP)

(72) Inventors: Kei Kobayashi, Wako (JP); Kotone Nakao, Wako (JP); Mai Numazawa, Wako (JP); Tomohiro Ito, Wako (JP); Kazutaka Nakabe, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 196 days.

(21) Appl. No.: 17/212,466

(22) Filed: Mar. 25, 2021

(65) Prior Publication Data

US 2021/0300213 A1 Sep. 30, 2021

(30) Foreign Application Priority Data

Mar. 30, 2020 (JP) ................................. 2020-060450

(51) Int. Cl.
*B60R 1/10* (2006.01)
*B60N 2/01* (2006.01)
*B60N 2/14* (2006.01)

(52) U.S. Cl.
CPC .................. *B60R 1/10* (2013.01); *B60N 2/01* (2013.01); *B60N 2/14* (2013.01)

(58) Field of Classification Search
CPC .......... B60N 2/01; B60N 2/14; B60N 2/3045; B60R 1/10; B60R 1/006; B60J 1/08; B60J 3/007
USPC ........................................ 296/64, 1.11, 96.19
See application file for complete search history.

(56) References Cited

U.S. PATENT DOCUMENTS

| | | | | | |
|---|---|---|---|---|---|
| 3,165,350 | A | * | 1/1965 | Willson | B60P 3/36 52/36.2 |
| 4,733,956 | A | * | 3/1988 | Erickson | B60R 1/008 248/467 |
| 5,576,898 | A | * | 11/1996 | Rubin | B60R 1/008 359/872 |
| 6,129,405 | A | * | 10/2000 | Miyahara | B60N 2/3097 296/65.13 |
| 6,495,261 | B1 | * | 12/2002 | Gagliardi | B32B 17/10018 296/84.1 |

(Continued)

FOREIGN PATENT DOCUMENTS

| CN | 106627055 A | * | 5/2017 | |
|---|---|---|---|---|
| EP | 1693245 A2 | * | 8/2006 | .............. B60N 2/01 |

(Continued)

OTHER PUBLICATIONS

Gardiner, Geoffrey. EP 1693245 A2, "Seat rows arrangement for a vehicle", machine translation, ip.com, Aug. 23, 2006 (Year: 2006).*

(Continued)

*Primary Examiner* — Jason S Morrow
*Assistant Examiner* — Wenwei Zhuo
(74) *Attorney, Agent, or Firm* — Squire Patton Boggs (US) LLP

(57) ABSTRACT

A vehicle includes a front seat, a rear seat, and a mirror body. The front seat is arranged to face rearward in a travel direction. The rear seat is arranged, at a rearward side of the front seat, to face frontward in the travel direction. The mirror body is arranged at a rearward position of the rear seat and reflects a vehicle frontward side.

7 Claims, 7 Drawing Sheets

(56) References Cited

U.S. PATENT DOCUMENTS

| | | | |
|---|---|---|---|
| 9,481,228 B2* | 11/2016 | Ishioka | B60J 1/02 |
| 9,895,864 B2* | 2/2018 | Dixon | B32B 17/10532 |
| 10,688,849 B2* | 6/2020 | Yamada | C03C 17/32 |
| 2003/0189165 A1* | 10/2003 | Samuels, Sr. | B60N 2/2839 250/221 |
| 2004/0190167 A1 | 9/2004 | Berger | |
| 2006/0186651 A1 | 8/2006 | Aoki | |
| 2009/0239017 A1* | 9/2009 | Ishioka | B32B 17/10761 427/163.1 |
| 2009/0257141 A1* | 10/2009 | Yamada | C03C 17/001 359/893 |
| 2015/0375603 A1* | 12/2015 | Mochizuki | B60R 21/026 296/97.9 |
| 2016/0332540 A1* | 11/2016 | Martin | B60N 2/39 |
| 2018/0056831 A1 | 3/2018 | James | |
| 2020/0276913 A1* | 9/2020 | Takahashi | B60N 2/005 |
| 2020/0369334 A1* | 11/2020 | Lee | B60K 1/04 |

FOREIGN PATENT DOCUMENTS

| | | |
|---|---|---|
| FR | 2622314 A1 * | 4/1989 |
| JP | 06-171412 A | 6/1994 |
| JP | 09-207637 A | 8/1997 |
| JP | 2007-290501 A | 11/2007 |
| JP | 2008-030517 A | 2/2008 |
| JP | 2018-062277 A | 4/2018 |
| WO | 2016/091188 A1 | 6/2016 |
| WO | 2019/032553 A1 | 2/2019 |
| WO | WO-2022249991 A1 * | 12/2022 |

OTHER PUBLICATIONS

First Office Action issued in corresponding Chinese Patent Application No. 202110275176.8 dated Dec. 21, 2022, with English translation thereof.

* cited by examiner

VEHICLE

CROSS-REFERENCE TO RELATED APPLICATION

Priority is claimed on Japanese Patent Application No. 2020-060450, filed on Mar. 30, 2020, the contents of which are incorporated herein by reference.

BACKGROUND

Field of the Invention

The present invention relates to a vehicle that includes a plurality of seats in an occupant room.

Background

In recent years, as a structure of an occupant room of a vehicle, such a structure is known in which a plurality of seats can be arranged in a face-to-face state (for example, refer to Japanese Unexamined Patent Application, First Publication No. 2018-62277).

In the vehicle described in Japanese Unexamined Patent Application, First Publication No. 2018-62277, a seat for an occupant is arranged in three rows at a rearward side of a driver's seat, and a seat in the center row is capable of being used as a table, and the seat direction of a seat in the front row is switched to a frontward side and a rearward side. When the seat in the center row is switched to the table and the seat direction of the seat in the front row is switched to the rearward side, the seat in the front row (hereinafter, referred to as a "front seat") and the seat in the rearmost row (hereinafter, referred to as a "rear seat") can be used in the face-to-face state.

SUMMARY

In the vehicle described above, by switching the seat direction of the front seat to the rearward side, the front seat and the rear seat can be used in a face-to-face state. However, when the front seat and the rear seat are used in the face-to-face state, an occupant seated in the front seat cannot easily confirm a moving situation of the vehicle in a normal seating attitude, and it is necessary to look back to the vehicle frontward side in the seating state in order to confirm the moving situation of the vehicle.

Further, in this type of vehicle, it is desirable that when the front seat and the rear seat are in a face-to-face state, the occupant on the front seat side is able to obtain a feeling of breadth inside the vehicle room.

An aspect of the present invention provides a vehicle that is able to enhance the comfort of an occupant who is seated on a front seat and who faces rearward.

A vehicle according to an aspect of the present invention includes: a front seat that is arranged to face rearward in a travel direction; a rear seat that is arranged, at a rearward side of the front seat, to face frontward in the travel direction; and a mirror body that is arranged at a rearward position of the rear seat and that is configured to reflect a vehicle frontward side.

According to the configuration described above, an occupant who is seated on the front seat and who faces rearward can view the vehicle frontward direction through the mirror body at the rearward positon of the rear seat. Further, since a view in front of the vehicle and a room interior view at a frontward side of the rear seat are reflected on the mirror body, it is possible to cause the occupant seated on the front seat to feel the feeling of breadth inside the vehicle room.

A side window through which a vehicle outside is capable of being viewed may be arranged on at least a vehicle body side part at a side of the rear seat.

In this case, light from the vehicle outside that enters the vehicle room inside through the side window is reflected by the mirror body to a frontward side of the rear seat. Therefore, it is possible to further brightly illuminate the vehicle room inside by external light.

The side window may be arranged on the vehicle body side part in a range from a side position of the rear seat to a side position of the front seat.

In this case, it is possible to further brightly illuminate the vehicle room inside according to the reflection by the mirror body. Further, since the side window is arranged in the range from the side position of the rear seat to the side position of the front seat, an occupant who is seated on the front seat and who faces rearward can comfortably view a scenery in a frontward and sideward direction of the vehicle that is reflected on the mirror body through the side window.

A lower end height of the mirror body may be equal to or less than a lower end height of the side window, and an upper end height of the mirror body may be equal to or more than an upper end of the side window.

In this case, since the mirror body is as wide as or wider than the vertical width of the side window, it is possible to favorably reflect the external scenery or the external light on the mirror body through the side window.

The vehicle may further include: an occupant room in which the front seat and the rear seat are arranged; a load room that is arranged behind the occupant room; and a partition wall that partitions the occupant room and the load room, wherein the mirror body may be provided on the partition wall.

In this case, it is possible to partition the occupant room and the load room by the partition wall and to ensure a comfortable space of the occupant room, and the condition of the load in the load room can be hidden by the mirror body from the occupant in the occupant room.

A vehicle drive system device may be arranged below a floor part of the load room.

In this case, it is possible to effectively utilize a vehicle space behind the mirror body and to further widely ensure a space in the occupant room.

A height of the lowest end part of a seat surface of the rear seat may be set to be higher than a height of the lowest end part of a seat surface of the front seat.

In this case, when occupants are seated on the front seat and the rear seat in the face-to-face state, the visual line height of an occupant seated on the front seat and the visual line height of an occupant seated on the rear seat are different from each other. Therefore, one of the occupants seated to face each other tends not to worry about the visual line of another occupant. Further, since the visual line height of the occupant seated on the rear seat is higher relative to the occupant seated on the front seat, a front sight of the occupant seated on the rear seat becomes good.

Further, the occupant who is seated on the front seat and who faces rearward tends to be susceptible to motion sickness due to shaking when the vehicle travels. However, in the present configuration, since the height of the lowest end part of the seat surface of the front seat is set to be low, the occupant who is seated on the front seat and who faces rearward is strongly pressed against a backrest, and the shaking of the body when the vehicle travels is prevented. Accordingly, in a case where the present configuration is employed, it is possible to prevent the motion sickness of the occupant who is seated on the front seat.

A glass having a dark color shielding part having dots which become gradually sparse toward an upward direction from a lower end may be attached to the side window.

In this case, since the dark color shielding part is arranged in a lower end region of the glass attached to the side window, it is possible to prevent an adjacent object such as a guardrail at the side of the traveling vehicle from entering the sight of the occupant. Specifically, in the present configuration, since the dots of the dark color shielding part are provided such that the dots become gradually sparse toward the upward direction from the lower end of the glass, the boundary between the dark color shielding part and the scenery outside the vehicle that is seen at the upper side of the dark color shielding part is naturally blurred, and uncomfortable feeling is not given to the occupant. Accordingly, in a case where the present configuration is employed, the occupant seated on the front seat or the rear seat can comfortably view the scenery outside the vehicle through the side window.

An arrangement range in a vertical direction of the dark color shielding part in the glass may be set in accordance with a height of a seat surface of the rear seat and a height of a seat surface of the front seat arranged at a side.

In this case, since the arrangement range in the vertical direction of the dark color shielding part is set in accordance with the visual line height of the occupant at the front seat and the rear seat, the adjacent object can be preferably hidden from the sight of the occupant seated in each seat.

The front seat may be constituted of a side-by-side seat in which a plurality of seats are arranged side-by-side in one lateral line, and the rear seat may be constituted of independent seats in which adjacent seats are capable of being arranged to be offset from each other in a vehicle front-to-rear direction.

In this case, since the front seat is the side-by-side seat, even when a plurality of occupants are seated on the seats of the front seat, an event in which the sight of an occupant who is seated on the seat and who sees the mirror body is blocked by an adjacent occupant does not easily occur. Further, since the rear seat is an independent seat capable of being arranged to be offset in the vehicle front-to-rear direction, even when a plurality of occupants are seated on the rear seat, upper bodies of the occupants seated adjacent to each other are less likely to come into contact with each other.

In the aspect of the present invention, since the mirror body that reflects the vehicle frontward side is arranged behind the rear seat, an occupant seated on the front seat can understand the moving situation of the vehicle without looking back to the vehicle frontward side, and it is possible to cause the occupant to feel a sense of openness and a sense of breadth inside the vehicle room through the mirror body. Accordingly, in a case where the aspect of the present invention is employed, it is possible to enhance the comfort of the occupant who is seated on the front seat and who faces rearward.

DESCRIPTION OF EMBODIMENTS

Figure 1:
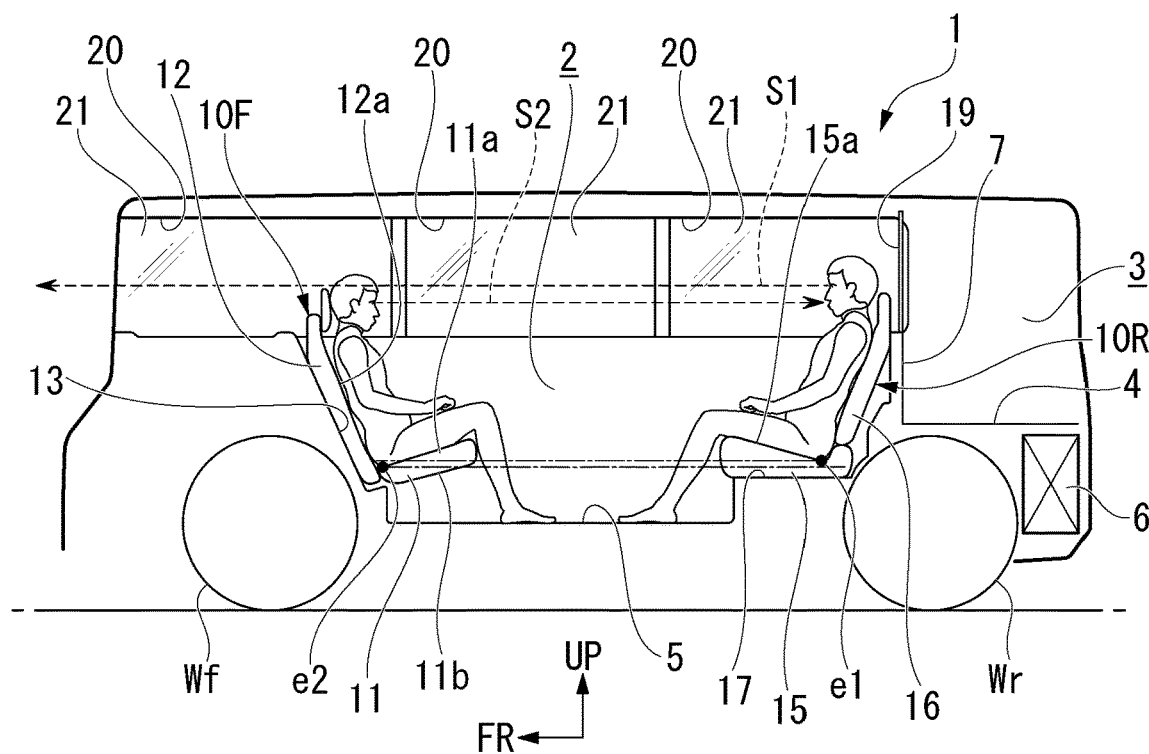
FIG. 1 is a schematic side view showing a vehicle inside of a vehicle according to an embodiment.

Hereinafter, an embodiment of the present invention will be described with reference to the drawings. In the drawings, an arrow FR that indicates a frontward side of a vehicle 1, an arrow UP that indicates an upward direction of the vehicle 1, and an arrow LH that indicates a leftward side of the vehicle 1 are shown.

Figure 2:
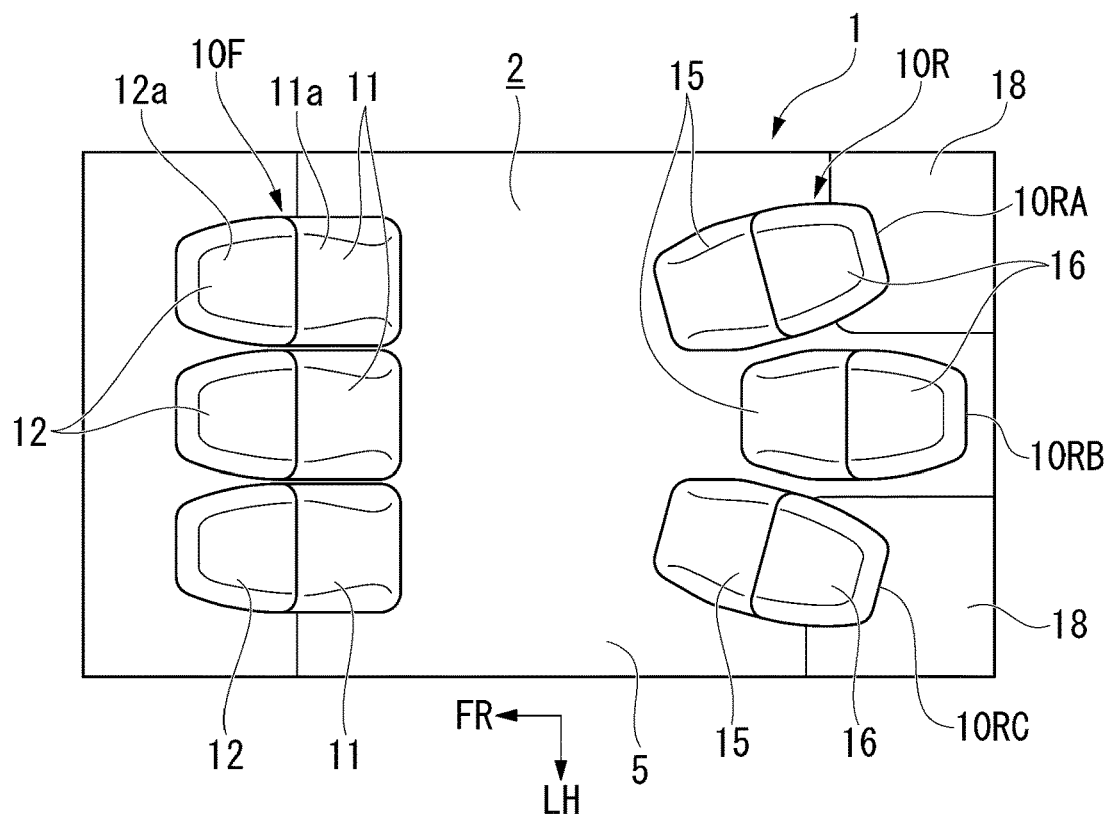
FIG. 2 is a schematic top view showing the vehicle inside of the vehicle according to the embodiment.

FIG. 1 is a side view of the vehicle 1 of the embodiment schematically showing a vehicle inside. FIG. 2 is a top view of the vehicle 1 of the embodiment schematically showing the vehicle inside.

The vehicle 1 is an automated driving vehicle capable of unmanned traveling, and an occupant room 2 on which an occupant boards is widely ensured in a middle region in a vehicle front-to-rear direction. Specifically, the occupant room 2 extends in the front-to-rear direction from a rear position of a front wheel Wf to the vicinity of a substantially middle position of a rear wheel Wr.

A load room 3 in which a load can be loaded from a vehicle rearward side is formed behind the occupant room 2. The occupant room 2 and the load room 3 are separated by a partition wall 7. A floor part 4 of the load room 3 is set to be higher than a floor part 5 of the occupant room 2. The floor part 4 of the load room 3 is arranged at a higher position than the rear wheel Wr. A battery, a control circuit, and the like (drive system device 6, not shown) for driving a motor for driving the vehicle is arranged below the floor part 4 of the load room 3.

A front seat 10F of a side-by-side seat type (bench seat type) in which a plurality of seats 11 are arranged side-by-side in one lateral line is arranged on a front side in the occupant room 2. A rear seat 10R of an independent seat type in which adjacent seats are capable of being arranged to be offset in the vehicle front-to-rear direction is arranged on a rear side in the occupant room 2.

The front seat 10F is arranged such that three seats 11 are arranged side-by-side in a lateral direction. A backrest 12 that corresponds to each seat 11 of the front seat 10F is fixed to a front frame 13 on a vehicle body front side in a state of being inclined frontward at a predetermined angle. Each seat 11 of the front seat 10F is capable of being flipped upward such that a front end side of the seat 11 is a rotation fulcrum point. The number of seats 11 of the front seat 10F may be two or more and is not limited to three.

Figure 3:
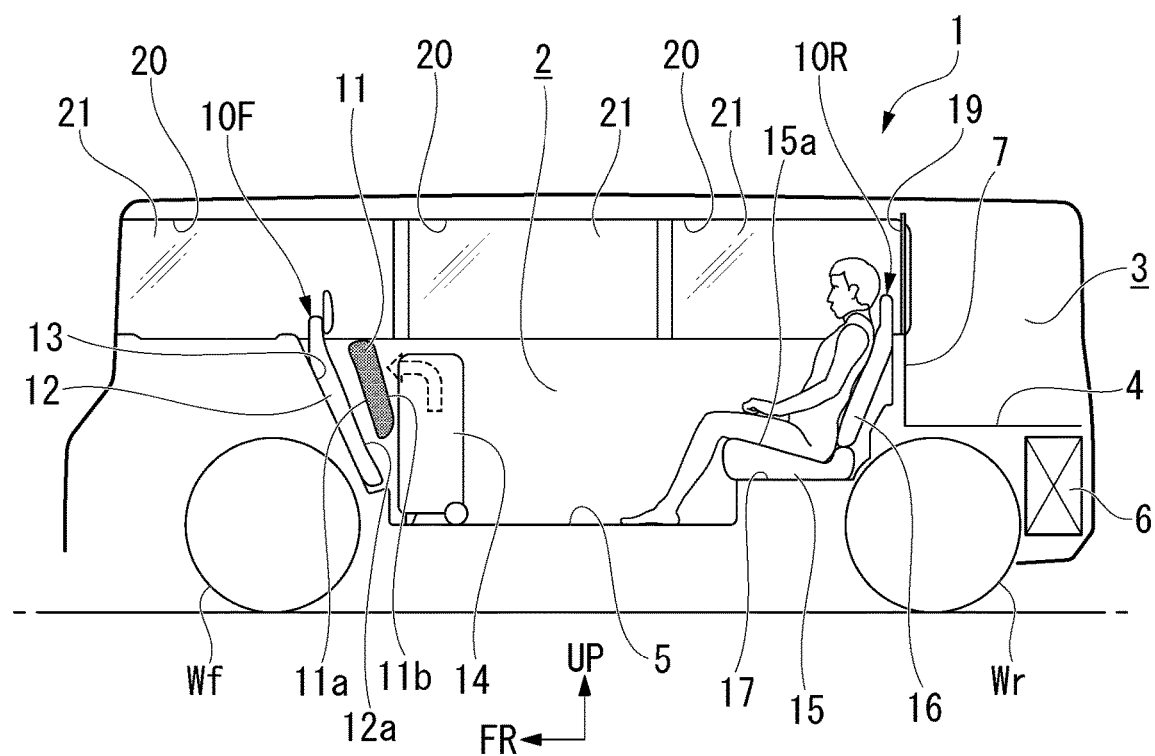
FIG. 3 is a schematic side view showing the vehicle inside of the vehicle according to the embodiment.

FIG. 3 is a side view of the vehicle 1 similar to FIG. 1 showing a state where the seat 11 of the front seat 10F is flipped upward.

In a state where each seat 11 of the front seat 10F is flipped upward, a seat surface 11a faces a backrest surface 12a of the backrest 12, and a rear surface 11b is directed toward the rear seat 10R side (vehicle rearward side) in a state of being inclined upward toward the vehicle rearward side. The floor part 5 of the occupant room 2 is constituted of a flat surface that extends from the vicinity of a front part of the rear seat 10R to a lower position of the backrest 12 of the front seat 10F. Therefore, as shown in FIG. 3, it is possible to arrange a large load 14 such as a suitcase in a space above the floor part 5 that is formed when the seat 11 of the front seat 10F is flipped up.

Figure 4:
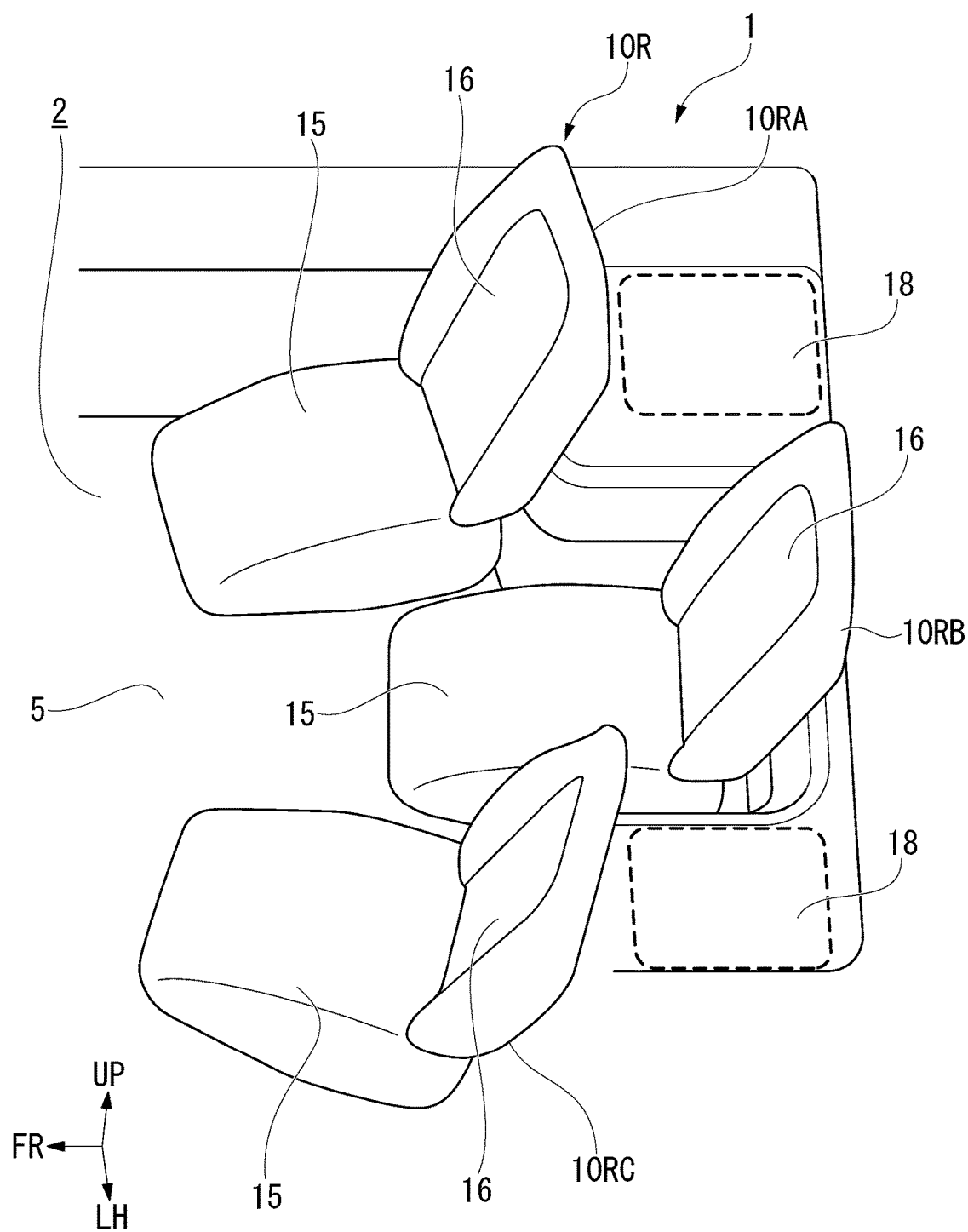
FIG. 4 is a perspective view showing a rear seat and the vicinity thereof of the vehicle according to the embodiment.

FIG. 4 is a perspective view showing the rear seat 10R in the occupant room 2.

In the rear seat 10R, three seat blocks 10RA, 10RB, and 10RC each constituted of a pair of the seat 15 and the backrest 16 are arranged to be spaced apart from each other in a vehicle width direction. In the two seat blocks 10RA and 10RC arranged at the outside in the vehicle width direction, each seat 15 is arranged to be inclined inward in the vehicle width direction relative to the vehicle frontward direction. The seat block 10RB at the middle in the vehicle width direction is arranged to face straight in the vehicle frontward direction. Further, the seat block 10RB at the center in the vehicle width direction is arranged to be offset to the vehicle rearward side relative to the two seat blocks 10RA and 10RC at the outside in the vehicle width direction.

In the present embodiment, the three seat blocks 10RA, 10RB, and 10RC are provided to be fixed to a frame 17 in the vehicle room. However, each block 10RA, 10RB, and 10RC may be movably arranged on the floor part 5 via a seat rail or the like.

Further, an article storage part 18 is arranged at a rearward position of each of the two seat blocks 10RA and 10RC at the outside in the vehicle width direction in the occupant room 2. It is possible for the article storage part 18 to store an article inside the article storage part 18, and it is also possible to place an article on an upper surface side of the article storage part 18.

Figure 5:
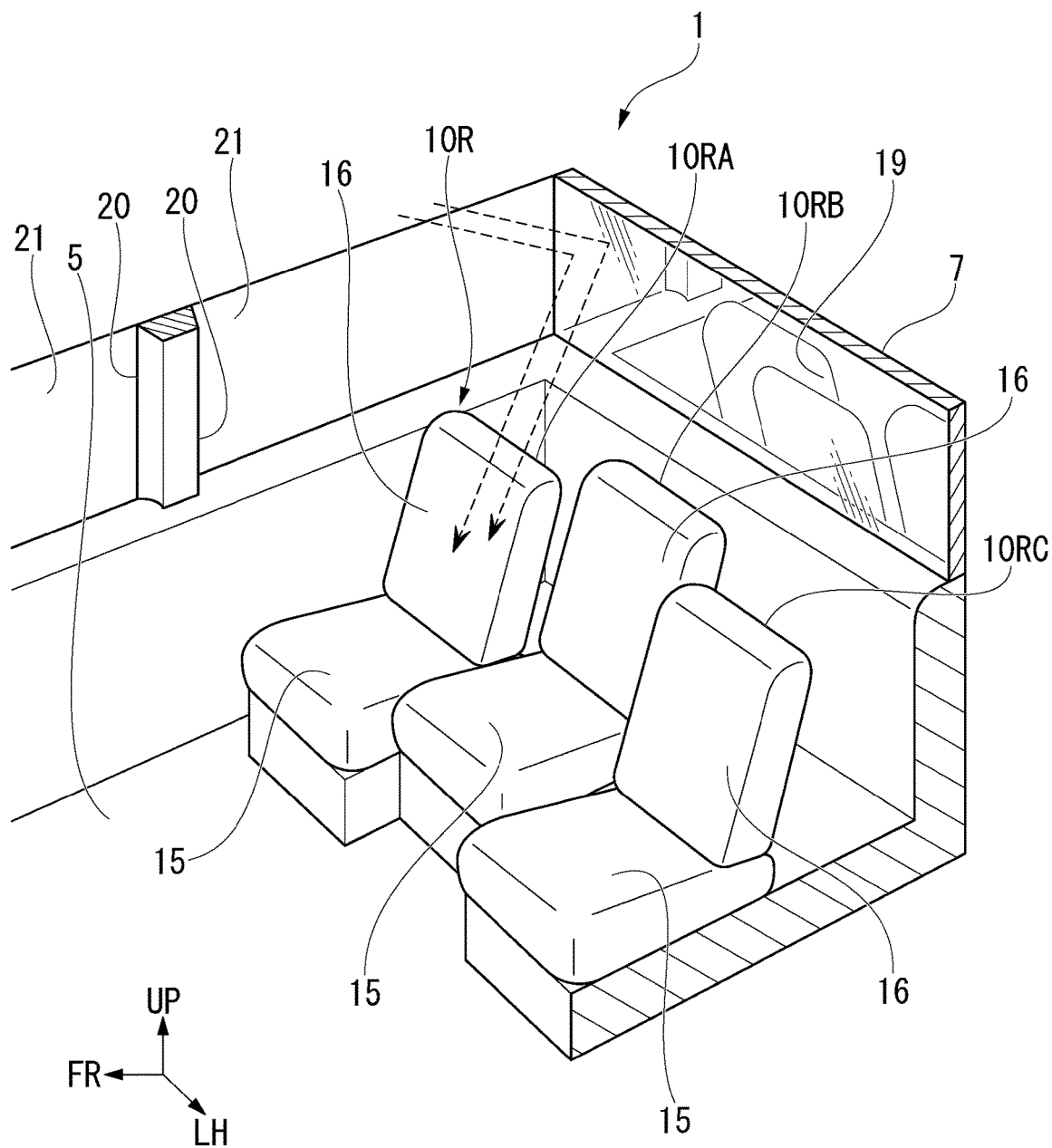
FIG. 5 is a perspective view showing the rear seat and the vicinity thereof of the vehicle according to the embodiment.

FIG. 5 is a perspective view showing the rear seat 10R and a part behind the rear seat 10R in the occupant room 2.

As shown in FIG. 1, FIG. 3, and FIG. 5, a mirror body 19 that reflects the vehicle frontward side is attached to a front surface (a plane that faces the vehicle frontward side) of the partition wall 7 that partitions the occupant room 2 and the load room 3. The mirror body 19 is arranged behind the backrest 16 of the rear seat 10R. The mirror body 19 is arranged to be continuous from one end side to another end side in the vehicle width direction.

A side window 20 through which a vehicle outside is capable of being viewed is arranged on a vehicle body side part. In the present embodiment, three side windows 20 are arranged from a side position of the rear seat 10R to a vehicle front end part.

A glass 21 is attached to each side window 20. The glass 21 attached to the side window 20 is not necessarily limited to a glass that consists of a glass material and also includes a transparent resin or the like having a light transmission property. Further, the number of side windows 20 arranged on the vehicle body side part is not limited to three and may be an arbitrary number. Further, the range in which the side window 20 is arranged is not limited to the range described above, and the side window 20 may be arranged on at least the vehicle body side part at a side of the rear seat 10R. However, it is desirable that the range in which the side window 20 is arranged is a range from the side position of the rear seat 10R to the side position of the front seat 10F of the vehicle body side part.

Here, the mirror body 19 attached to the partition wall 7 in the occupant room 2 is provided such that the height of an end part is equal to or less than the height of a lower end part of the side window 20, and the height of an upper end part is set to be equal to or more than the height of an upper end of the side window 20. Therefore, in the vehicle of the present embodiment, it is possible to favorably reflect the external scenery or the external light on the mirror body 19 through the side window 20.

Further, as shown in FIG. 1, the height of the lowest end part e1 of a seat surface 15a of the rear seat 10R provided in the occupant room 2 is set to be higher than the lowest end part e2 of the seat surface 11a of the front seat 10F. Therefore, when occupants are seated on the front seat 10F and the rear seat 10R in the face-to-face state, the visual line height of the occupant seated on the rear seat 10R is higher relative to (the visual line height of) the occupant seated on the front seat 10F.

Figure 6:
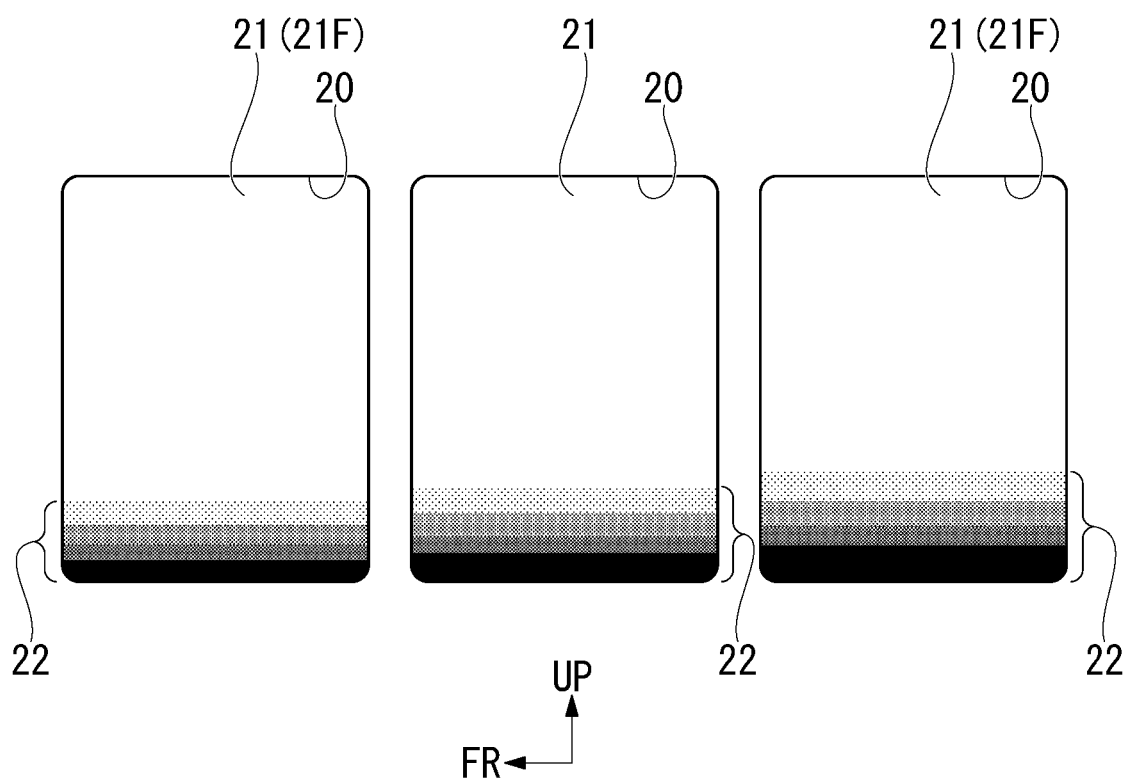
FIG. 6 is a side view showing a glass attached to a side window according to the embodiment.
Figure 7:
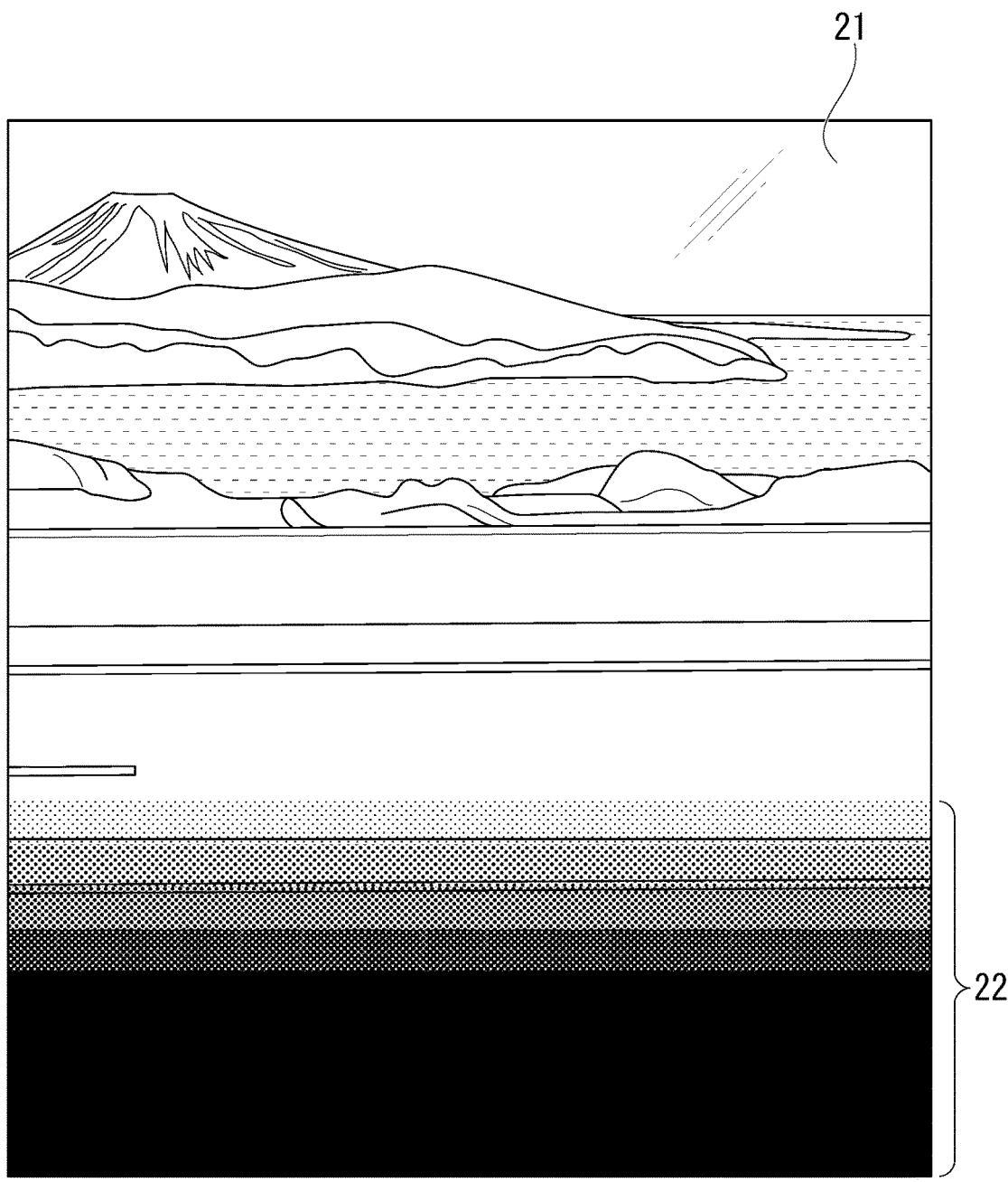
FIG. 7 is a view showing a state in which a vehicle outside is seen through the glass according to the embodiment.
Figure 8:
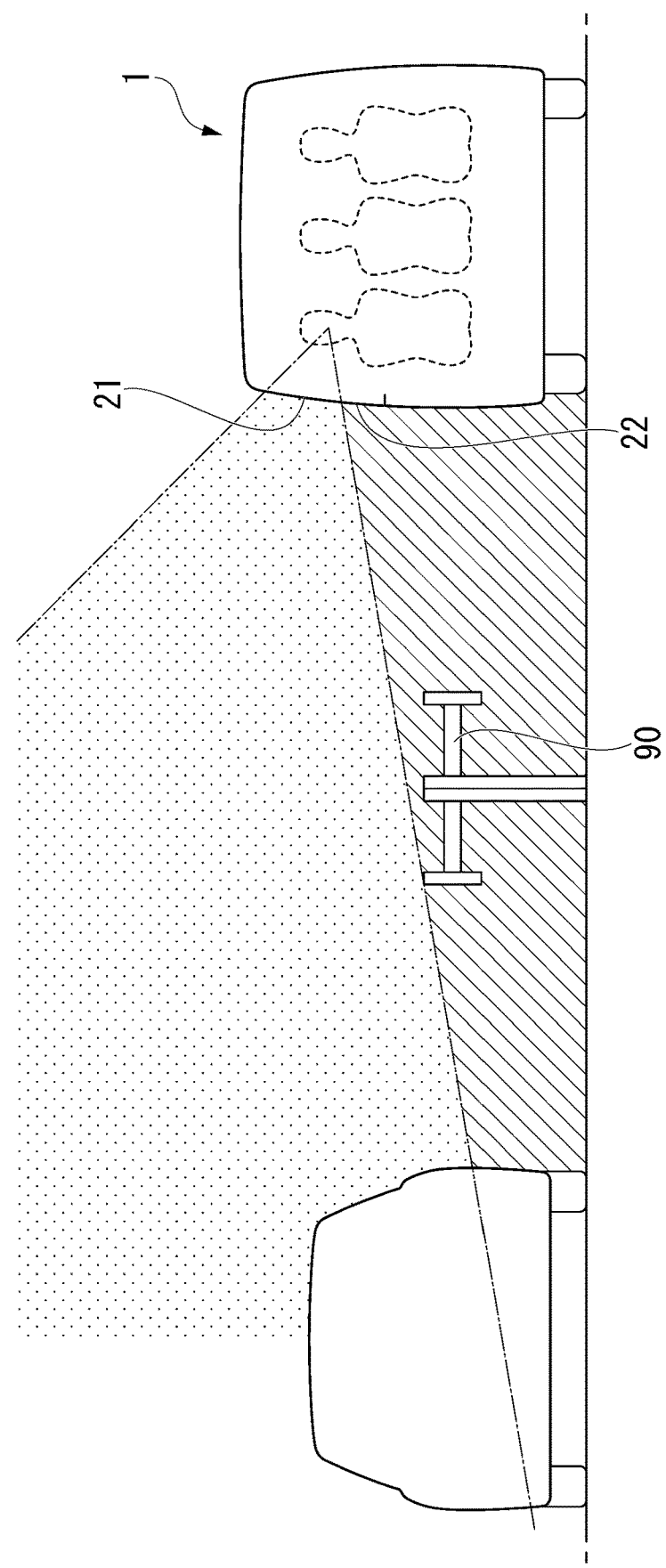
FIG. 8 is a front view of the vehicle schematically showing a condition when the vehicle outside is seen through the glass according to the embodiment.

FIG. 6 is a side view showing the glass 21 attached to the three side windows 20 at the vehicle body side part. FIG. 7 is a view showing a condition when the vehicle outside is seen through the glass 21. FIG. 8 is a front view of the vehicle 1 schematically showing a condition when the vehicle outside is seen through the glass 21.

A black ceramics 22 which is one form of a dark color shielding part is attached to a lower end region of each glass 21. As shown in FIG. 6 and FIG. 7, the black ceramics 22 is attached in a dot form in a predetermined range in the vertical direction at a lower end of the glass 21. Dots of the black ceramics 22 are attached such that the dots become gradually sparse toward the upward direction from the lower end of the glass 21. The black ceramics 22 can prevent an adjacent object 90 (refer to FIG. 8) such as a guardrail at the side of the traveling vehicle from entering the sight of the occupant. Further, since in the black ceramics 22, the dots are provided such that the dots become gradually sparse toward the upward direction from the lower end, it is possible to naturally blur the boundary between the black ceramics 22 and the scenery outside the vehicle that is seen at the upper side of the black ceramics 22.

In the present embodiment, the black ceramics 22 is employed as one form of the dark color shielding part. However, the dark color shielding part may be a material other than the black ceramics 22 as long as the dark color shielding part is a material that is dark and that can shield the external light.

Further, the arrangement range in the vertical direction of the black ceramics 22 in the glass 21 is set in accordance with the height of the seat surface 15a of the rear seat 10R and the height of the seat surface 11a of the front seat 10F arranged at a side of the glass 21. Specifically, as shown in FIG. 6, in the glass 21 (21R) arranged at the side part of the rear seat 10R of which the height of the seat surface 15a is high, the range in the vertical direction in which the black ceramics 22 is arranged is widened compared to the glass 21 (21F) arranged at the side part of the front seat 10F.

As described above, in the vehicle 1 of the present embodiment, since the mirror body 19 that reflects the vehicle frontward side is arranged behind the rear seat 10R, an occupant seated on the front seat 10F can understand the moving situation of the vehicle 1 without looking back to the vehicle frontward side, and it is possible to cause the occupant to feel a sense of openness and a sense of breadth inside the vehicle room through the mirror body 19. Accordingly, in the vehicle 1 of the present embodiment, it is possible to enhance the comfort of the occupant who is seated on the front seat 10F and who faces rearward.

Further, in the vehicle 1 of the present embodiment, the side window 20 through which the vehicle outside is capable of being viewed is arranged at a side on the vehicle outside of the rear seat 10R behind which the mirror body 19 is arranged. Therefore, light from the vehicle outside that enters the vehicle room inside through the side window 20 is able to be reflected by the mirror body 19 to the frontward side of the rear seat 10R. Accordingly, by employing the present configuration, it is possible to further brightly illuminate the vehicle room inside by external light.

Specifically, in the vehicle 1 of the present embodiment, since the side window 20 is arranged at least in a range from the side position of the rear seat 10R to the side position of the front seat 10F, it is possible to further brightly illuminate the vehicle room inside according to the reflection by the mirror body 19. Further, an occupant who is seated on the front seat 10F and who faces rearward can comfortably view a scenery in a frontward and sideward direction of the vehicle that is reflected on the mirror body 19 through the side window 20.

Further, the vehicle 1 of the present embodiment is set such that the lower end height of the mirror body 19 is equal to or less than the lower end height of the side window 20, and the upper end height of the mirror body 19 is equal to or more than the upper end height of the side window 20. Therefore, it is possible to favorably reflect the external scenery or the external light on the mirror body 19 through the side window 20.

Further, in the vehicle 1 of the present embodiment, since the mirror body 19 is provided on the partition wall 7 that partitions the occupant room 2 and the load room 3, a comfortable space of the occupant room 2 can be ensured at the frontward side of the load room 3, and the condition of the load in the load room 3 can be hidden by the mirror body 10 from the occupant in the occupant room 2.

Further, in the vehicle 1 of the present embodiment, since the drive system device 6 of the vehicle is arranged below the floor part 4 of the load room 3, it is possible to effectively utilize the vehicle space behind the mirror body 19 and to further widely ensure the space in the occupant room 2.

Further, in the vehicle 1 of the present embodiment, the height of the lowest end part e1 of the seat surface 15a of the rear seat 10R is set to be higher than the height of the lowest end part e2 of the seat surface 11a of the front seat 10F. Therefore, when occupants are seated on the front seat 10F and the rear seat 10R in the face-to-face state, the height of the visual line s1 of an occupant seated on the rear seat is higher than the height of the visual line s2 of an occupant seated on the front seat 10F. Accordingly, when the present configuration is employed, one of the occupants seated to face each other tends not to worry about the visual line of another occupant. Further, since the height of the visual line s1 of the occupant seated on the rear seat 10R is higher relative to the upper body of the occupant seated on the front seat 10F, the front sight of the occupant seated on the rear seat 10R becomes good.

Further, in the vehicle 1 of the present embodiment, since the height of the lowest end part e2 of the seat surface 11a of the front seat 10R is set to be low, the occupant who is seated on the front seat 10F and who faces rearward is strongly pressed against the backrest 12, and the shaking of the body when the vehicle travels is prevented. Accordingly, in a case where the vehicle 1 of the present embodiment is employed, it is possible to prevent the motion sickness of the occupant who is seated on the front seat 10F.

Further, in the vehicle 1 of the present embodiment, the black ceramics 22 is attached to the glass 21 of the side window 20 such that the dots become gradually sparse toward the upward direction from the lower end. Therefore, at the time of traveling of the vehicle 1, it is possible to prevent an adjacent object 90 such as a guardrail at the side of the vehicle 1 from entering the sight of the occupant in the occupant room 2. Specifically, in the present embodiment, since the dots of the black ceramics 22 are provided such that the dots becomes gradually sparse toward the upward direction from the lower end of the glass 21, the boundary between the black ceramics 22 and the scenery outside the vehicle that is seen at the upper side of the black ceramics 22 is naturally blurred, and uncomfortable feeling is not given to the occupant. Accordingly, in a case where the present configuration is employed, the occupant seated on the front seat 10F or the rear seat 10R can comfortably view the scenery outside the vehicle through the side window 20.

Further, in the vehicle 1 of the present embodiment, the arrangement range in the vertical direction of the black ceramics 22 in the glass is set in accordance with the height of the seat surface 15a of the rear seat 10R and the height of the seat surface 11a of the front seat 10F arranged at a side. Therefore, the adjacent object 90 can be preferably hidden from the sight of the occupant seated in each seat.

Further, in the vehicle 1 of the present embodiment, the front seat 10F is constituted of a side-by-side seat (bench seat), and the rear seat 10R is constituted of independent seats in which adjacent seats are offset from each other in the vehicle front-to-rear direction. In this case, since the front seat 10F is the side-by-side seat, even when a plurality of occupants are seated on the seats 11 of the front seat 10F, an event in which the sight of an occupant who is seated on the seat 11 and who sees the mirror body 19 is blocked by an adjacent occupant does not easily occur. Further, since the rear seat 10R is an independent seat offset in the vehicle front-to-rear direction, even when a plurality of occupants are seated on the rear seat 10R, upper bodies of the occupants seated adjacent to each other are less likely to come into contact with each other. Accordingly, in a case where the configuration of the present invention is employed, it is possible to further enhance the comfort of the occupant in the occupant room 2.

The present invention is not limited to the embodiment described above, and various design changes can be made without departing from the scope of the invention.

What is claimed is:
1. A vehicle, comprising:
   a front seat that is arranged to face rearward in a travel direction;
   a rear seat that is arranged, at a rearward side of the front seat, to face frontward in the travel direction; and
   a mirror body that is arranged at a rearward position of the rear seat and that is configured to reflect a vehicle frontward side,
   wherein a side window through which a vehicle outside is capable of being viewed is arranged on at least a vehicle body side part at a side of the rear seat, and
   wherein a lower end height of the mirror body is equal to or less than a lower end height of the side window, and an upper end height of the mirror body is equal to or greater than an upper end of the side window.
2. The vehicle according to claim 1,
   wherein the side window is arranged on the vehicle body side part in a range from a side position of the rear seat to a side position of the front seat.
3. The vehicle according to claim 1, further comprising:
   an occupant room in which the front seat and the rear seat are arranged;
   a load room that is arranged behind the occupant room; and
   a partition wall that partitions the occupant room and the load room,
   wherein the mirror body is provided on the partition wall.

4. The vehicle according to claim 3,
wherein a vehicle drive system device is arranged below a floor part of the load room.

5. The vehicle according to claim 1,
wherein a height of the lowest end part of a seat surface of the rear seat is set to be higher than a height of the lowest end part of a seat surface of the front seat.

6. A vehicle, comprising:
a front seat that is arranged to face rearward in a travel direction;
a rear seat that is arranged, at a rearward side of the front seat, to face frontward in the travel direction; and
a mirror body that is arranged at a rearward position of the rear seat and that is configured to reflect a vehicle frontward side, wherein:
a side window through which a vehicle outside is capable of being viewed is arranged on at least a vehicle body side part at a side of the rear seat,
the side window is arranged on the vehicle body side part in a range from a side position of the rear seat to a side position of the front seat, and
a glass having a dark color shielding part having dots which become gradually sparse toward an upward direction from a lower end is attached to the side window, wherein
an arrangement range in a vertical direction of the dark color shielding part in the glass is set in accordance with a height of a seat surface of the rear seat and a height of a seat surface of the front seat arranged at a side.

7. The vehicle according to claim 1,
wherein the front seat is constituted of a side-by-side seat in which a plurality of seats are arranged side-by-side in one lateral line, and
the rear seat is constituted of independent seats in which adjacent seats are capable of being arranged to be offset from each other in a vehicle front-to-rear direction.

* * * * *